United States Patent
Kuzukawa (10) Patent No.: US 9,791,016 B2
(45) Date of Patent: Oct. 17, 2017

(54) LIQUID SEALED MOUNT (71) Applicant: FUKOKU CO., LTD., Ageo-shi, Saitama (JP)

(72) Inventor: Mitsuo Kuzukawa, Ageo (JP)

(73) Assignee: Fukoku Co., Ltd., Saitama (JP)

( * ) Notice: Subject to any disclaimer, the term of this patent is extended or adjusted under 35 U.S.C. 154(b) by 63 days.

(21) Appl. No.: 14/426,774

(22) PCT Filed: Sep. 10, 2013

(86) PCT No.: PCT/JP2013/005358
§ 371 (c)(1),
(2) Date: Mar. 9, 2015

(87) PCT Pub. No.: WO2014/038215
PCT Pub. Date: Mar. 13, 2014

(65) Prior Publication Data
US 2015/0240905 A1 Aug. 27, 2015

(30) Foreign Application Priority Data

Sep. 10, 2012 (JP) ................................. 2012-198854

(51) Int. Cl.
*F16F 13/20* (2006.01)
*F16F 13/10* (2006.01)

(52) U.S. Cl.
CPC .............. *F16F 13/20* (2013.01); *F16F 13/10* (2013.01); *F16F 13/101* (2013.01); *F16F 13/108* (2013.01); *F16F 2228/04* (2013.01)

(58) Field of Classification Search
CPC ........ F16F 13/10; F16F 13/105; F16F 13/106; F16F 5/00; F16F 9/16
See application file for complete search history.

(56) References Cited

U.S. PATENT DOCUMENTS 4,352,487 A 10/1982 Shtarkman
4,738,434 A * 4/1988 Marjoram ............... F16F 13/26
267/140.13

(Continued)

FOREIGN PATENT DOCUMENTS

DE 102004035677 A1 3/2006
DE 102008029061 A1 12/2009

(Continued)

OTHER PUBLICATIONS

EP Search Report; Jun. 30, 2016; 6 pages.

*Primary Examiner* — Thomas J Williams
*Assistant Examiner* — James Hsiao
(74) *Attorney, Agent, or Firm* — McNees Wallace & Nurick LLC (57) ABSTRACT

[Object] To provide a durable liquid-sealed mount that allows a relative displacement between a stud and a housing, i.e., large strokes, has good cushioning properties, has good damping properties by inhibiting cavitation from generating even if high frequency vibration is introduced, and can still absorb small amplitude and high frequency vibration.
[Solving Means] A liquid-sealed mount 1 is attached between a first member and a second member for controlling vibration introduced to the first member or the second member and includes a cup-shaped housing 10, a stud 20, a cap member 30, a diaphragm 40, highly viscous liquid 50, air, a movable damping plate 70, and a support member 80. The support member 80 is positioned between a lower end of the stud 20 or the movable damping plate 70 and the diaphragm 40 and transmits a load in a compression direction applied to the stud 20 to the diaphragm 40.

12 Claims, 5 Drawing Sheets

(56) References Cited

U.S. PATENT DOCUMENTS

| | | | | |
|---|---|---|---|---|
| 4,921,049 | A * | 5/1990 | Kaiser | F16F 13/10 267/140.13 |
| 4,946,147 | A * | 8/1990 | Kato | F16F 13/10 267/140.13 |
| 5,104,100 | A * | 4/1992 | Simuttis | F16F 13/106 267/140.13 |
| 5,295,671 | A * | 3/1994 | Nakagaki | F16F 13/10 248/638 |
| 5,433,421 | A * | 7/1995 | Ishiyama | F16F 13/107 248/559 |
| 5,632,472 | A * | 5/1997 | Kato | F16F 13/10 267/140.13 |
| 5,681,032 | A * | 10/1997 | Hofmann | F16F 13/26 267/140.13 |
| 5,707,048 | A * | 1/1998 | Kuzukawa | F16F 13/08 267/140.11 |
| 6,601,835 | B2 * | 8/2003 | Genesseaux | F16F 13/268 267/140.13 |
| 7,341,244 | B1 | 3/2008 | Adams | |
| 7,604,223 | B2 * | 10/2009 | Kuzukawa | F16F 13/08 267/140.13 |
| 2002/0130455 | A1 * | 9/2002 | Yamamoto | F16F 13/105 267/140.13 |
| 2002/0140143 | A1 * | 10/2002 | Yamamoto | F16F 13/106 267/140.13 |
| 2005/0189686 | A1 * | 9/2005 | Andou | F16F 13/105 267/140.13 |
| 2006/0163784 | A1 * | 7/2006 | Yamamoto | F16F 13/10 267/140.13 |
| 2009/0289472 | A1 | 11/2009 | Catanzarite et al. | |
| 2010/0109218 | A1 * | 5/2010 | Lemaire | F16F 13/106 267/140.13 |
| 2010/0213650 | A1 * | 8/2010 | Katayama | F16F 13/107 267/118 |
| 2011/0042870 | A1 * | 2/2011 | Kojima | F16F 13/10 267/140.11 |
| 2013/0001842 | A1 * | 1/2013 | Kanaya | F16F 13/106 267/140.13 |
| 2013/0187318 | A1 * | 7/2013 | Shimamura | F16F 13/10 267/140.13 |
| 2013/0292889 | A1 * | 11/2013 | Power | F16F 13/106 267/140.13 |
| 2014/0367192 | A1 * | 12/2014 | Kim | F16F 13/10 181/161 |
| 2015/0048562 | A1 * | 2/2015 | Satori | F16F 13/101 267/140.13 |

FOREIGN PATENT DOCUMENTS

| | | |
|---|---|---|
| FR | 2494370 A1 | 5/1982 |
| GB | 2027517 A | 2/1980 |
| JP | 63-275827 A | 11/1988 |
| JP | H08206129 A | 8/1996 |
| JP | H10103815 A | 4/1998 |
| JP | H11119904 A | 4/1999 |
| JP | 2003322198 A | 11/2003 |
| JP | 2005180542 | 7/2005 |
| JP | 2010270850 | 12/2010 |

* cited by examiner

LIQUID SEALED MOUNT

TECHNICAL FIELD

The present invention relates to a liquid-sealed mount for supporting heavy goods, and absorbing and damping vibration.

BACKGROUND ART

In a construction machine such as a power shovel, a liquid-sealed mount is used to improve a ride quality of an operator who rides on a cab (operator's cabin). The liquid-sealed mount is positioned between the cab and a vehicle body frame, supports the cab, and absorbs and damps vibration so that the vibration is not transmitted from a vehicle body frame side to a cab side.

For example, Patent Documents 1 and 2 each discloses a liquid-sealed mount where a movable damping plate is positioned in a housing in which highly viscous liquid is sealed, the movable damping plate is connected to an upper stud, and a lower part of the movable damping plate is supported by a spring member. For example, the stud is connected to the cab, and the housing is connected to the vehicle body frame.

In these liquid-sealed mounts, the vibration in up and down direction of the cab applied to the vehicle body frame is absorbed mainly by elastic deformation of the spring, and the vibration absorbed by the spring is damped by a flow resistance of the liquid when the movable damping plate connected to the stud is moved in the highly viscous liquid.

Patent Document 3 discloses a liquid-sealed mount including an attachment member having a connecting bolt protruded upward; a support cylinder member; an elastic support connecting one end of the support cylinder member to the attachment member, the other end of the support member being closed by an elastic diaphragm member, a liquid chamber in which a liquid is filled being separated into a pressure receiving chamber and an equilibrium chamber by a divider and both the chambers being in communication with each other through an orifice; a bevel-shaped member protruded from the attachment member to a receiving chamber side; and a cup-shaped member having a connection bolt protruded downward and fixed to a rear surface side of the elastic diaphragm member, which is connected by a caulking part so as to close a lower end opening side of the support cylinder member. For example, the attachment member is connected to an engine side, and the cup-shaped member is connected to a vehicle body side.

In the liquid-sealed mount, a vibration in a vertical direction of an engine to a vehicle body is absorbed mainly by elastic deformation of the elastic support, and the vibration absorbed by the elastic support is damped by a flow resistance of the liquid moving between the pressure receiving chamber and the equilibrium chamber through the orifice.

Patent Document 4 discloses a vibration control apparatus including an inner cylinder metal member having an implant bolt protruded upward; an outer cylinder metal member; an elastic body connecting one end of the outer cylinder metal member to the inner cylinder metal member, the other end of the outer cylinder metal member being closed by a diaphragm, a liquid chamber in which highly viscous liquid is filled being separated into two chambers by a damping plate attached to a lower end of the inner cylinder metal member, which are in communication with each other through a gap formed between an outer peripheral end of the damping plate and an inner periphery of a concave part of the elastic body; a cap member disposed at a rear surface side of the diaphragm, protruded downward and fixed to a lower end of the outer cylinder metal member; and a gas chamber configured of the diaphragm and the cap member, a gas being sealed in the gas chamber. For example, the inner cylinder metal member is connected to a cabin, and the outer cylinder metal member is connected to a vehicle body.

In the liquid-sealed mount, a vibration in a vertical direction of the cabin to the vehicle body is absorbed mainly by elastic deformation of the elastic support, and the vibration absorbed by the elastic support is damped by a flow resistance of the highly viscous liquid through which the damping plate connected to the inner cylinder metal member is moved.

Patent Document 1: Japanese Patent Application Laid-open No. H08-254241

Patent Document 2: Japanese Patent Application Laid-open No. 2003-322198

Patent Document 3: Japanese Patent Application Laid-open No. H07-54912

Patent Document 4: Japanese Patent Application Laid-open No. H09-280299

SUMMARY OF INVENTION

Problem to be Solved by the Invention

In the technologies described in Patent Documents 1 and 2, as large strokes are allowed while supporting the cab, a support member is made pliable to absorb and damp the vibration. If the vibration introduced is a vibration having a large amplitude and an excessively high vibration frequency, i.e., a large amplitude and high frequency vibration (for example, several tens Hz), the highly viscous liquid cannot sufficiently follow an action of the movable damping plate connected to the stud, thereby generating cavitation and undesirably decreasing damping properties. In addition, if the vibration introduced is a vibration having a small amplitude and an extremely high vibration frequency, i.e., small amplitude and high frequency vibration (for example, several tens to several hundreds Hz), the highly viscous liquid between the movable damping plate connected to the stud and a bottom wall part cannot almost follow the action of the movable damping plate, thereby acting as a non-flowable body, not absorbing the vibration introduced and undesirably transmitting the vibration to the bottom wall part of a case or the stud. In other words, in the technologies described in Patent Documents 1 and 2, if a moving speed of the movable damping plate is high and the highly viscous liquid cannot sufficiently follow the action of the movable damping plate, the cavitation is generated and the damping properties are decreased, and if the highly viscous liquid cannot almost follow the action of the movable damping plate, the highly viscous liquid cannot flow, thereby undesirably decreasing vibration absorption properties.

In the technology described in Patent Document 3, the load of the engine applied to the attachment member is supported by the elastic support and the space between the elastic diaphragm member and the cup-shaped member is open to air through a hole provided at the bottom, thereby not supporting the load applied to the attachment member. Accordingly, the elastic support has to support the load of the engine and has a relatively high stiffness (high spring constant). Therefore, the large strokes of the stud are not allowed, thereby undesirably providing insufficient vibration absorption properties.

In the technology described in Patent Document 4, the load of the cabin applied to the inner cylinder metal member is supported by a shear spring of an elastic body being long in an axial direction of the inner cylinder metal member. Accordingly, the elastic body has to support the load of the cabin and has a relatively high stiffness (high spring constant). Therefore, the large strokes of the stud are not allowed, thereby undesirably providing insufficient vibration absorption properties. In addition, the air chamber provided below the damping plate, once an excess internal pressure is applied to the liquid chamber, absorbs the internal pressure of the liquid chamber and mitigates the increase of the internal pressure in the liquid chamber so as to inhibit damages of the elastic body, the outer cylinder metal member, and the cap member.

In view of the above-described circumstances, an object of the present invention is to provide a durable liquid-sealed mount that allows a relative displacement between the stud and the housing, i.e., the large strokes, has good vibration absorption properties, has good damping properties by inhibiting the cavitation from generating even if high frequency vibration is introduced, and can still absorb small amplitude and high frequency vibration.

Means for Solving the Problem

In order to achieve the above-described object, a liquid-sealed mount according to an embodiment of the present invention is to be attached between a first member and a second member for controlling vibration introduced to the first member or the second member, and includes a cup-shaped housing; a stud; a cap member; a diaphragm; highly viscous liquid; air; a movable damping plate; and a support member. Here, the first member is a vehicle body frame and the second member is a cab (operator's cabin), for example.

The cup-shaped housing has an opening at a top and is to be attached to the first member.

The stud is positioned at a center of the housing in a diameter direction and is to be attached to the second member.

The cap member is fixed to the opening of the housing so as to form a sealed chamber between the cap member and the housing and holds the stud movably at least in an axial direction of the housing.

The diaphragm separates the sealing chamber into a liquid chamber and an air chamber formed at a bottom of the housing.

The highly viscous liquid is sealed in the liquid chamber. The air is sealed in the air chamber.

The movable damping plate is positioned in the liquid chamber, a gap is provided between the movable damping plate and an inner wall of the housing, the liquid is capable of passing through the gap as a flow path (first flow path), and the movable damping plate is attached to the stud.

The support member is positioned between a lower end of the stud or the movable damping plate and the diaphragm and is configured to transmit a load in a compression direction applied to the stud to the diaphragm. In the present invention, "the load in a compression direction" refers to, for example, a load in a direction where a distance between the stud disposed at the opening at the top of the cup-shaped housing and the bottom of the cup-shaped housing is reduced, and refers to a load from the stud to the bottom of the cup-shaped housing when the load is applied to the stud.

Effect of the Invention

According to the present invention, as the liquid-sealed mount includes the support member having the above-described configuration, the load applied to the stud can be transmitted to the air chamber disposed below the movable damping plate, and the load applied to the stud can be supported by an air spring in the air chamber. In this manner, while allowing a relative displacement between the stud and the housing, i.e., the large strokes, the cavitation is inhibited from generating, damping properties are prevented from being lowering, and small amplitude and high frequency vibration can be also absorbed. Further, the air chamber is inhibited from being expanding more than necessary so as to control the pressure applied to the liquid chamber adequately, and excellent durability can be provided.

MODE(S) FOR CARRYING OUT THE INVENTION

A liquid-sealed mount according to an embodiment of the present invention is to be attached between a first member and a second member for controlling vibration introduced to the first member or the second member and, includes a cup-shaped housing; a stud; a cap member; a diaphragm; highly viscous liquid; air; a movable damping plate; and a support member.

The cup-shaped housing has an opening at a top and is to be attached to the first member.

The stud is positioned at a center of the housing in a diameter direction and is to be attached to the second member. The stud is made of a metal, for example.

The cap member is fixed to the opening of the housing so as to form a sealed chamber between the cap member and the housing and holds the stud movably at least in an axial direction of the housing. The cap member is, for example, a thinner layer made of a rubber material, is vulcanized adhered and fixed liquid-tightly to the stud, and preferably holds the stud oscillating freely up, down, left, and right. In another embodiment, the cap member is, for example, a relatively thick layer made of a rubber material, and preferably holds the stud being liquid-tight movable in a vertical direction via the sleeve disposed at an outer periphery side thereof. In other words, the cap member preferably does not limit at least a movement of the stud in the vertical direction in a certain range.

The diaphragm separates the sealing chamber into a liquid chamber and an air chamber, the air chamber being formed at a bottom of the housing.

The highly viscous liquid is sealed in the liquid chamber. The air is sealed in the air chamber. The air in the air chamber is preferably sealed in a pressurized state, and may be configured such that pressurized air can be injected from outside by pressurizing means.

The movable damping plate is positioned in the liquid chamber, a gap is provided between the movable damping plate and an inner wall of the housing, the liquid is capable of passing through the gap as a flow path (first flow path), and the movable damping plate is attached to the stud.

The support member is positioned between a lower end of the stud or the movable damping plate and the diaphragm and is configured to transmit a load in a compression direction applied to the stud to the diaphragm.

In the liquid-sealed mount according to one embodiment of the present invention, when the load in the compression direction is applied from the second member to the stud, a force of the load in the compression direction is transmitted from the stud to the diaphragm, i.e., the air chamber, via the support member. If no support member is provided, the cap member connected to the stud is depressed, a load is applied to the liquid chamber and the air chamber, and the load in the compression direction applied to the stud will be supported by a reaction force. In other words, as the liquid in the liquid chamber is little subjected to compression deformation, the air chamber is compressed via the liquid and the load in the compression direction applied to the stud will be supported by the air spring in the air chamber. In this case, as both of the liquid chamber and the air chamber have high pressure, the cap member requires stiffness enduring the pressure. The stud to which the cap member having such stiffness is adhered does not allow the large strokes in the vertical direction, whereby sufficient vibration absorbing properties are difficult to be provided.

In contrast, if the support member is provided, the force of the load in the compression direction is transmitted from the stud to the diaphragm, and the diaphragm is recessed to an air chamber side and supports the load in the compression load applied to the stud. In other words, the liquid in the liquid chamber does not need to support the load applied to the stud and a liquid pressure for supporting the load is not increased. Therefore, the stud to which a pliable cap member is adhered allows the large strokes in the vertical direction and sufficient vibration absorption properties can be provided.

At this time, by controlling an amount of the liquid housed in the liquid chamber, an appropriate pressure can be applied to the liquid. Accordingly, in the liquid-sealed mount of the present invention, by controlling the pressure applied to the liquid as appropriate, cavitation is less generated in the liquid even with the large strokes and high damping properties can be maintained.

As described above, if no support member is provided and an excess pressure is applied to the liquid, a stress for expanding externally is generated on the cap member by the pressure, thereby easily breaking the cap member. In contrast, if the support member is provided, the pressure of the liquid can be arbitrarily controlled. By controlling the pressure, the stress for expanding externally beyond the allowable stress is not applied to the cap member. Especially if the cap member that has no need to support the load of an object to be shock-absorbed and is pliable such that the movement of the stud is limited is used, the large strokes are allowed, thereby providing a durable liquid-sealed mount having excellent vibration absorbing properties.

As described above, if no support member and air spring in the air chamber are provided, the highly viscous liquid acts like a non-flowable body once small amplitude and high frequency vibration that the highly viscous liquid cannot follow are added to the stud. Accordingly, a reaction force is generated to a vertical movement of the movable damping plate to undesirably transmit the vibration to a housing side. In contrast, if the support member and the air spring in the air chamber are provided, the support member and the diaphragm move vertically along with the vertical movement of the movable damping plate. The liquid between the lower surface of the movable damping plate and the upper surface of the diaphragm can therefore move vertically together with the movable damping plate. In this manner, the highly viscous liquid does not inhibit the vertical movement of the movable damping plate and the vibration can be absorbed by the air spring. Accordingly, in this embodiment, the cap member is hard to be broken, thereby providing a durable liquid-sealed mount. In addition, the cap member can be composed of a thinner layer, thereby providing excellent vibration absorption in the vertical direction and the horizontal direction and damping of vibration.

Here, in the mount of Patent Document 4 as described above, the load applied to the inner cylinder metal member is mainly supported by the elastic body and a part of the load is also supported by the liquid sealed in the liquid chamber and the gas sealed in the air chamber. In principle, the pressures of the liquid chamber and the air chamber are therefore equal. Accordingly, when a large load is applied to the inner cylinder metal member, the pressures of the air chamber and the liquid chamber increase correspondingly. The stiffness of the cap member should be high. In contrast, in the liquid-sealed mount according to this embodiment, as the stud is not supported by the pressure in the liquid chamber, the pressure in the liquid chamber can be freely set as appropriate. The pressure in the liquid chamber depends on the volume of the high viscosity liquid sealed in the liquid chamber having a certain volume, and depends on an expansion degree of the air chamber to the volume of the liquid chamber. Also, it is possible to control the liquid pressure by sealing air in the liquid chamber together with the liquid and controlling the pressure of the air. Accordingly, the internal pressure of the liquid chamber can be controlled irrespective of the load of the object to be shock-absorbed. For example, in one embodiment, the highly viscous liquid is sealed in the pressurized state, whereby it is possible to enhance basic properties such as inhibiting the generation of cavitation and damping of vibration.

In the liquid-sealed mount according to one embodiment of the present invention, in a neutral status where at least a load of the second member is statically applied to the stud, it is preferable that the air chamber supports the load applied to the stud via the support member. In this way, for example, only thin rubber functions as a vibration transmission member between the first member and the second member, and the micro vibration in the horizontal direction is therefore difficult to be transmitted.

Here, the internal pressure of the air chamber is preferably higher than the internal pressure of the liquid chamber. In addition, the support member is preferably formed integrally with the stud.

In the liquid-sealed mount according to one embodiment of the present invention, the support member is preferably composed of an elastic member such as a rubber material. As the support member is composed of the elastic member, the damping properties can be further enhanced by elastic deformation of the support member. Also, in one embodiment, the support member such as a columnar body is configured to have a larger volume, thereby easily controlling the flow resistance of the liquid flow path formed between the inner wall of the housing etc. and the support member.

The gap as the main liquid flow paths is one of parameters of controlling the flow resistance of the damping of main liquid flow paths (the first flow path, a second flow path described later, and a flow path connecting the first flow path and the second flow path). Since the size of the housing is determined based on the load to the mount and left and right strokes, the size of the damping plate cannot be freely set. According to the embodiment, the damping can be controlled based on the gap as the main liquid flow paths and further can be controlled by the size of the support member. For example, if the movable damping plate has a larger area, the flow amount of the liquid is increased even at a minute displacement, which increases the flow resistance. By enlarging the support member disposed at the lower surface of the movable damping plate, the flow amount of the liquid at the minute displacement can be decreased, which can decrease the flow resistance. In other words, the damping properties can be controlled based on the size of the support member.

In the liquid-sealed mount according to one embodiment of the present invention, the support member preferably includes a means for preventing fixing to the diaphragm disposed at a contact surface of the support member to the diaphragm. For example, it is preferable that the support member is integrally attached to the stud by, for example, fitting and that grooves for preventing intimately contacting with the diaphragm are disposed at a contact surface with the diaphragm. In this manner, the support member is not intimately in contact with the diaphragm, thereby further facilitating the movement of the stud in the horizontal direction. Accordingly, the vibration absorbing properties become excellent in the minute displacement. As the support member is not intimately in contact with the diaphragm, it is possible to prevent the diaphragm from being broken as a result of restriction of displacement of the diaphragm in the direction other than the vertical direction, thereby improving the durability.

In the liquid-sealed mount according to one embodiment, it is preferable that the cap member is composed of the elastic member, has a center part liquid-tightly sealed to the stud penetrating therethrough, is formed of a disk shape, and is capable of following an action of the stud.

The liquid-sealed mount according to one embodiment of the present invention preferably includes a first fixed damping plate fixed between the cap member and the movable damping plate, separating the liquid chamber into a first chamber and a second chamber, and having a through hole at a center in a radial direction into which the stud is inserted, a predetermined gap being provided between an inner periphery of the through hole and an outer periphery of the stud inserted. In this case, the first fixed damping plate preferably has a by-pass passage channel for by-passing the liquid between the first chamber and the second chamber. The by-pass passage channel is provided, whereby a flow control of the liquid becomes easier between the first chamber and the second chamber. Here, if the by-pass passage channel is provided directly above the movable damping plate, flowability of the highly viscous liquid between the first chamber and the second chamber can be further enhanced. In that case, a groove is provided so as not to clog a flow outlet at a second chamber side of the by-pass passage channel upon the contact with the movable damping plate, whereby the flowability can be further enhanced. On the other hand, if the by-pass passage channel is provided at a position not directly above the movable damping plate, i.e., at a position corresponding to an outer periphery side than the movable damping plate, under predetermined conditions, the flowability of the liquid between the first chamber and the second chamber can be further enhanced. In summary, the by-pass flow path is provided, whereby the flow of the liquid can be autonomously controlled. Also, the first fixed damping plate preferably includes: a core material having a cylinder part extending in the axial direction of the stud, and an attachment plate made of a metal attached to the housing, the cylinder part being fixed to an inner peripheral end of the attachment plate; and a rubber part disposed at an inner periphery of the cylinder part facing to the outer periphery of the stud, for example.

The liquid-sealed mount according to one embodiment of the present invention preferably includes a second fixed damping plate fixed between the movable damping plate and the diaphragm, and having a through hole at a center in a radial direction into which the support member is inserted, a predetermined gap being provided between an inner periphery of the through hole and an outer periphery of the support member inserted. In this case, the second fixed damping plate preferably includes a guide member that is configured of integrating a cylinder part and a flange part disposed at an outer periphery of the cylinder part and attached to the housing. A predetermined gap between the cylinder part and the outer periphery of the support member functions as a third flow path for the liquid. In this manner, the third flow path formed between the guide member and the support member enhances the function to damp the vibration. In addition, since the first fixed damping plate and the guide member restrict the displacement in the horizontal direction at two points of the stud and the support member, not only the displacement in the horizontal direction of the stud is limited, but also rollovers of the stud and the support member are limited even upon a rotation displacement.

Hereinafter, embodiments according to the present disclosure will be described with reference to the drawings.

Figure 1:
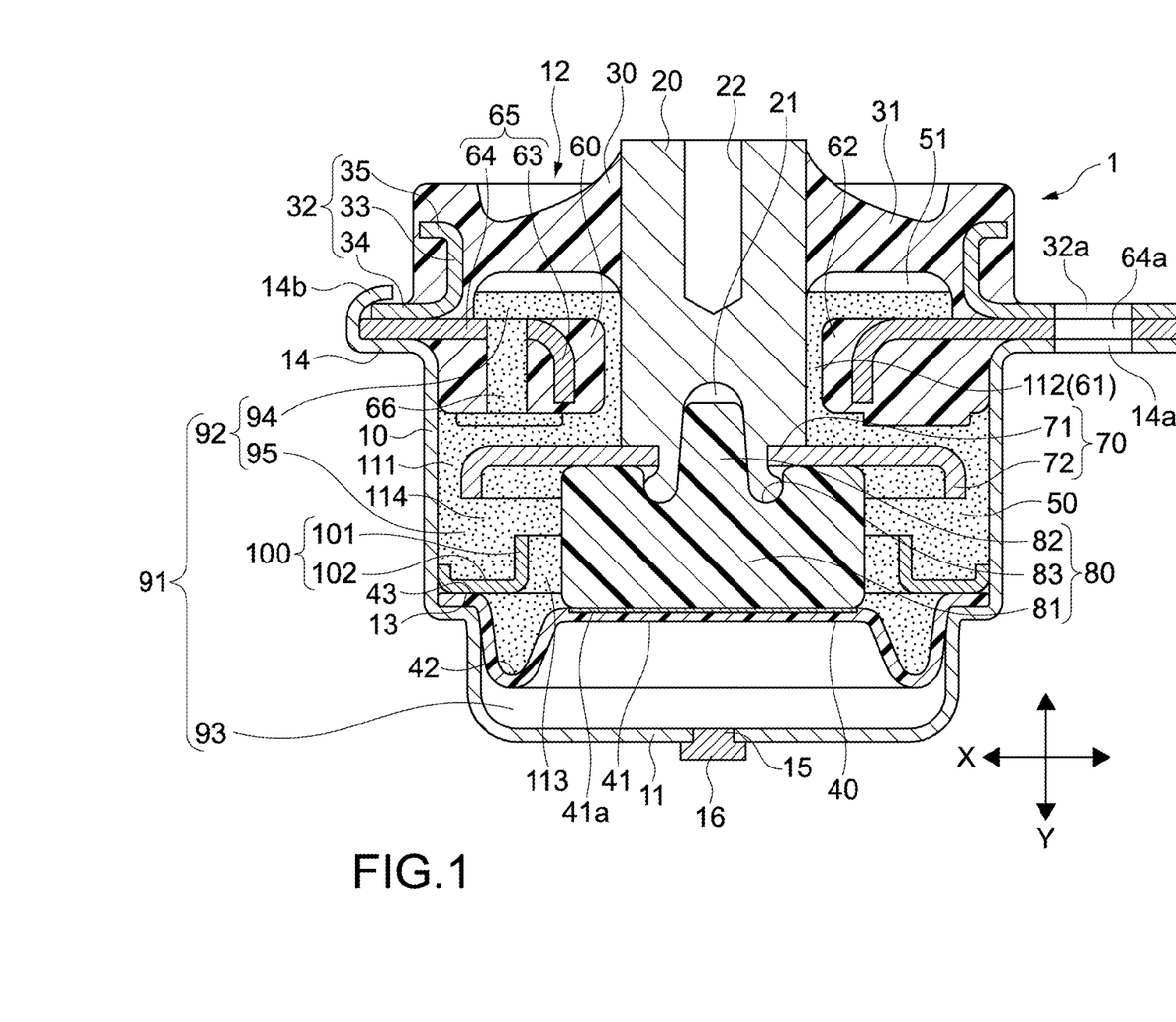
FIG. 1 A cross-sectional diagram showing a configuration of a liquid-sealed mount according to an embodiment of the present invention.
Figure 2:
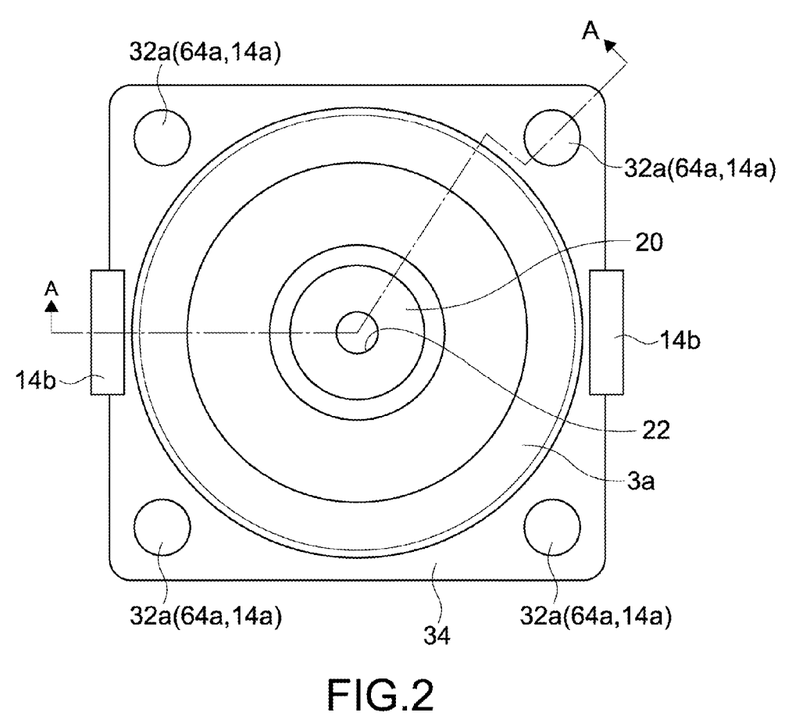
FIG. 2 A top view showing the configuration of the liquid-sealed mount shown in FIG. 1.

FIG. 1 is a cross-sectional diagram showing a configuration of a liquid-sealed mount according to an embodiment of the present invention. FIG. 2 is a top view showing a configuration of the liquid-sealed mount shown in FIG. 1. The cross-sectional diagram of FIG. 1 is viewed from a direction of an arrow along an A-A cross section in FIG. 2.

As shown in the figures, a liquid-sealed mount 1 includes a cup-shaped housing 10, a stud 20, a flexible sealing cap 30 as the cap member, a diaphragm 40, a high viscous liquid 50, a fixed damping plate 60 as the first fixed damping plate, a movable damping plate 70 and a support member 80.

The cup-shaped housing 10 is made of a metal, for example, and has a closed end 11 at a bottom and an opening 12 at a top. On the housing 10, a flange surface 13 is provided by a stepped structure where a diameter of an air chamber described later gets narrower. The housing 10 has a flange part 14 including through-holes-for-attachment 14a around an outer periphery of the opening 12. The closed end 11 is provided with a gas injection hole 15. The gas injection hole 15 is closed by a cap 16, for example.

The stud 20 is positioned at a center of the housing 10 (axis line of the housing 10) in a diameter direction (X direction in the figure). The stud 20 is made of a metal, for example, and protruded outside from an opening 12 side of the housing 10. A screw hole for attachment 22 is provided at an upper end thereof and is connected to a cab (not shown)

as a second member. The movable damping plate 70 is caulked and the support member 80 is fitted at a lower end of the stud 20.

The flexible sealing cap 30 as the cap member is fixed to the opening 12 such that a sealed chamber 91 is formed between the flexible sealing cap 30 and an inner wall of the housing 10. The flexible sealing cap 30 is composed of a thinner layer part 31 and an attachment part 32. As the thinner layer part 31, a rubber material is formed in, for example, a donut-like shape, a center hole thereof is vulcanized adhered to an upper part of the stud 20 for liquid-tight sealing. The attachment part 32 includes a center cylinder part 33, a flange part 34 extending from a lower end of the cylinder part 33 to a circumferential direction and fixed to an end of the housing 10, and a disk surface 35 extending from an upper end of the cylinder part 33 to the circumferential direction. The cylinder part 33 is vulcanized adhered to an outer periphery side of the thinner layer part 31 for liquid-tight sealing.

For example, the cylinder part 33 and the disk part 35 are buried into the thinner layer part 31, and the flange part 34 is exposed from the thinner layer part 31 from a lower surface to the outer periphery of the thinner layer part 31. On the flange part 34, through-holes-for-attachment 32a are provided. When the stud 20 or the housing 10 is subjected to load from objects to be shock-absorbed (not shown) such as a vehicle body and a cab in a vertical direction, the center part of the thinner layer part 31 fixed to the stud 20 or the periphery of the thinner layer part 31 fixed to the housing 10 by using the attachment part 32 is warped in the vertical direction. In other words, the thinner layer part 31 has a function to liquid-tight seal the housing 10 and the stud 20.

The diaphragm 40 is a member for separating the sealed chamber 91 into a liquid chamber 92 and an air chamber 92 formed at the bottom of the housing. The diaphragm 40 is a thin layer made of a rubber material. The diaphragm 40 includes a flat part 41 for receiving the support member 80, the flat part 41 having a size substantially the same as that of an outer periphery of the cylinder support member 80, a concave part 42 slightly recessed to an air chamber 93 side at an outer periphery side of the flat part 41, and a flange part 43 fixed to the flange surface 13 of the housing 10 at an outer periphery side of the concave part 42. A disk-shaped contact plate 41a made of a metal or a resin is exposed on an upper surface of the flat part 41 made of the rubber. The flange part 43 is disposed on the flange surface 13 and a guide member 100 is fitted in the housing 10 to be on the flange surface 13, whereby the diaphragm 40 is fixed to the housing 10 and the housing 10 is separated into the liquid-light liquid chamber 92 and the air-tight air chamber 93.

Figure 8:
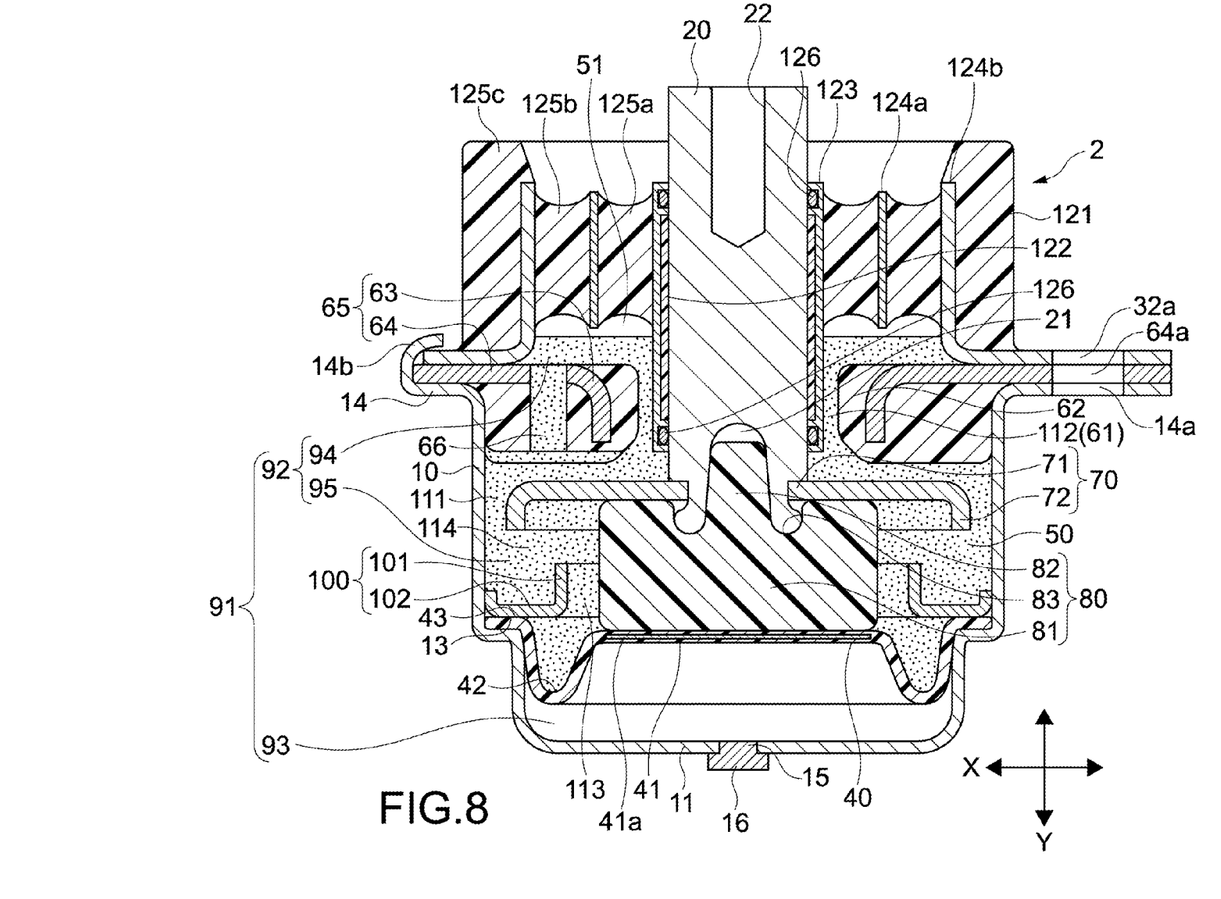
FIG. 8 A cross-sectional diagram showing a configuration of a liquid-sealed mount according to another embodiment of the present invention.

Here, if the contact plate 41a is made of stainless steel and adhered to the diaphragm 40 in an exposed state, the rubber support member 80 and the stainless steel contact plate 41a are in contact with each other and slide better than they do in a rubber-to-rubber contact state. In the liquid-sealed mount 1 according to this embodiment, as the flexible sealing cap 30 as the cap member is pliable, restriction in a horizontal direction may be lower. Accordingly, a micro vibration in the horizontal direction is well absorbed. Note that if silicone oil, which has extremely high lubricity, is used as the highly viscous liquid, the disk-shaped contact plate 41a may not be exposed and may be built in the flat part 41, or no contact plate 41a may be provided. In fact, in this case, even if the rubber support member 80 and the rubber diaphragm are in contact with each other, the rubber members normally used slide to some degree, which may not cause a problem. Rather, some rubber materials may be bonded. It is functionally desirable that the contact plate 41a be exposed. On the other hand, like another embodiment described later as shown in FIG. 8, if the contact plate 41a is built-in, the entire surface is vulcanized adhered. Advantageously, a steel plate rusted easily can be used as the contact plate 41a, and a possible peeling unlikely occurs.

In the liquid chamber 92, air 51 is sealed together with the highly viscous liquid 50, for example. If the liquid chamber 92 is not fully filled with the liquid 50 and air is left therein or air is positively injected thereto, it is easy to absorb a volume mismatch caused by an injection amount error of the liquid 50 or a dimension error of each component. In addition, if the air 51 is pressurized to a predetermined pressure and is sealed in the liquid chamber 92 together with the highly viscous liquid 50, the highly viscous liquid 50 can be pressurized, whereby it is possible to enhance basic damping properties such as inhibiting the generation of cavitation and damping of vibration. Desirably, the air 51 is sealed at a predetermined pressure. An inlet communicating the liquid chamber 92 with outside may be provided and pressurized air may be injected from outside by pressurizing means.

In this embodiment, the highly viscous liquid 50 is silicone oil having a kinetic viscosity of 50000 $mm^2$/sec (cSt) at 25° C. Depending on use conditions, silicone oil having a kinetic viscosity of about 10000 to 100000 $mm^2$/sec (cSt) at 25° C. can be used, as appropriate.

The fixed damping plate 60 as the first fixed damping plate separates the liquid chamber 92 into a first chamber 94 and a second chamber 95 adjacent in an axial direction (Y direction in the figure). The fixed damping plate 60 has a donut-like shape having a through hole 61 at the center in a radial direction of the housing 10, where the stud 20 penetrates through the through hole 61 and a gap as a second flow path 112 is provided between the through hole 61 and the stud 20, the highly viscous liquid 50 being capable of passing through the second flow path 112 between the first chamber 94 and the second chamber 95. The fixed damping plate 60 includes an elastic body part 62 such as rubber, and an attachment 65 made of for example metal composed of a cylinder part 63 where surrounding of the through hole 61 extends downward and a flange part 64. The elastic body part 62 is vulcanized adhered such that the inner and outer peripheries and the lower end of the cylinder part 63 are successively coated to integrally form the fixed damping plate 60. In the outer part of the flange part 64, through-holes-for-attachment 64a are provided.

The through hole 61 of the fixed damping plate 60 functions not only as the flow path for damping vibration, but also as a stopper for movement of the stud 20 in a horizontal direction (X direction in the figure). If the cap member has stiffness in the horizontal direction, the through hole 61 may not function as a stopper.

Upon assembling the liquid-sealed mount 1, the flange part 64 of the fixed damping plate 60 is placed on the flange part 14 of the housing 10 and the flange part 34 of the flexible sealing cap 30 is placed on the flange part 64 of the fixed damping plate 60. At this time, the respective flange parts are positioned such that the through-holes-for-attachment 14a, 64a, and 32a formed in the respective flange parts are aligned. In this state, the flange part 14 of the housing 10 is caulked by caulk pieces 14b provided on the flange part 14 of the housing 10 such that the flange part 64 of the fixed damping plate 60 and the flange part 34 of the flexible sealing cap 30 are enfolded. In this manner, the housing 10, the fixed damping plate 60, and the flexible sealing cap 30 are integrated. The liquid-sealed mount 1 is mounted on a vehicle as the second member by bolts (not shown) through these through-holes-for-attachment 14*a*, 64*a*, and 32*a*.

Figure 3:
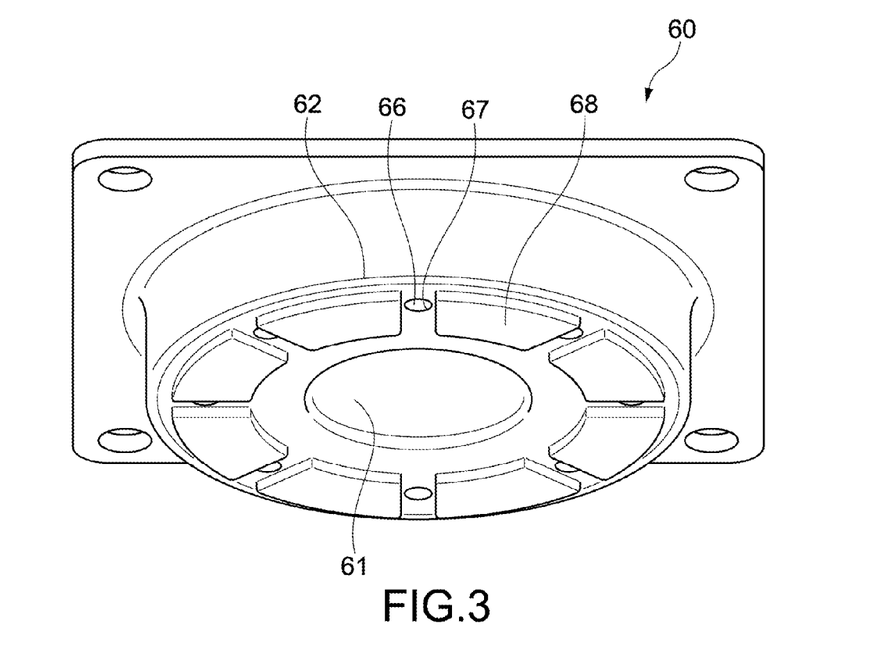
FIG. 3 A perspective diagram of a fixed damping plate shown in FIG. 1 viewed from downward.

As shown in FIG. 3, the fixed damping plate 60 has by-pass passage channels 66 for by-passing the highly viscous liquid 50 between the first chamber 94 and the second chamber 95. For example, it is preferable that the plurality of by-pass passage channels 66 are provided at equal intervals on a concentric circle. In this way, the by-pass passage channels 66 are provided in addition to the second flow path 112, whereby it is easy to control a flow of the highly viscous liquid 50 between the first chamber 94 and the second chamber 95. In other words, the flow of the highly viscous liquid 50 in the second flow path 112 depends on a diameter of the stud 20, a thickness of an inner periphery of the fixed damping plate 60, and a diameter of the through hole 61 of the fixed damping plate 60. The diameter of the stud 20, the thickness of an inner periphery of the fixed damping plate 60, and the diameter of the through hole 61 of the fixed damping plate 60 are often subjected to the restriction of design from the object to be shock-absorbed, and the flow control of the highly viscous liquid 50 is limited. As the by-pass passage channels 66 are not subjected to the restriction of design from the object to be shock-absorbed, it is easy to control the flow of the highly viscous liquid 50 between the first chamber 94 and the second chamber 95.

If the by-pass passage channels 66 are provided directly above the movable damping plate 70, flowability of the highly viscous liquid 50 between the first chamber 94 and the second chamber 95 can be further enhanced. This is because the liquid 50 will directly pass through the by-pass passage channels 66 when the movable damping plate 70 moves vertically as the by-pass passage channels 66 are provided directly above the movable damping plate 70.

Step parts 68 are provided at a lower surface of the fixed damping plate 60 so as not to clog flow outlets 67 of the by-pass passage channels 66 at a second chamber 95 side upon the contact with the movable damping plate 70. In this manner, the movable damping plate 70 can be prevented from adsorbing to the lower ends of the by-pass passage channels 66.

On the other hand, the flow outlets 67 of the by-pass passage channels 66 at the second chamber 95 side can be positioned so as to face a first flow path 111. In this case, when the movable damping plate 70 moves upward and comes in contact with the lower surface of the fixed damping plate 60, the by-pass passage channels 66 are not blocked. Therefore, the highly viscous liquid 50 pushed up from the second flow path 112 can flow smoothly to the first flow path 111 through the by-pass passage channels 66.

The movable damping plate 70 is positioned in the second chamber 95 such that a gap as the first flow path 111 is provided between the movable damping plate 70 and an inner wall of the housing 10, the highly viscous liquid 50 being capable of passing through the gap. The movable damping plate 70 is made of a metal, for example, and is configured of integrating a disk part 71 and a cylinder part 72 directing downward from an outer periphery of the disk part 71. The movable damping plate 70 is caulked to the lower end of the stud 20.

The support member 80 is positioned between the stud 20 and the diaphragm 40 and is to transmit a load from the stud 20 to the diaphragm 40 when the load is applied to the stud 20. The support member 80 is composed of an elastic member, for example, a rubber material. As the support member 80 is composed of the elastic member such as the rubber material, the support member 80 itself can be deformed. An internal friction due to the deformation is added to further enhance the damping properties. It should be appreciated that a hard material such as a resin may be used for the support member 80 instead of the elastic member. Note that the load of the object to be shock-absorbed applied to the stud 20 is supported by air spring in the air chamber 93 separated by the diaphragm 40 via the support member 80, a lower surface of the support member 80 does not separate from the diaphragm 40.

Figure 4:
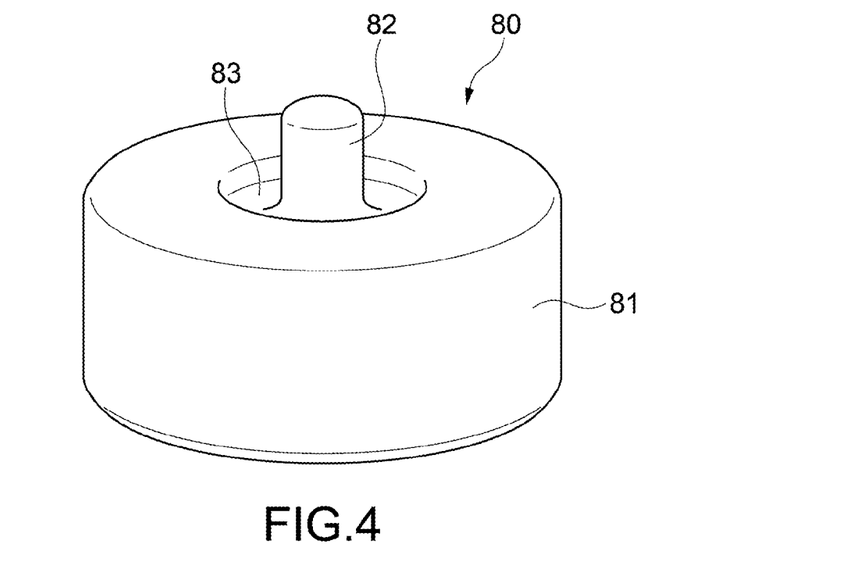
FIG. 4 A perspective diagram of a support member shown in FIG. 1 viewed from upward.

As shown in FIG. 4, the support member 80 is configured of integrating a columnar-shaped body part 81 and a protruded part 82 protruded from an upper center of the body part 81 and connected to the stud 20. The body part 81 includes a concave part 83 surrounding a base part of the protruded part 82.

The support member 80 is integrally attached to the stud 20 by inserting the protruded part 82 into a hole 21 provided at the lower end of the stud 20.

Figure 5:
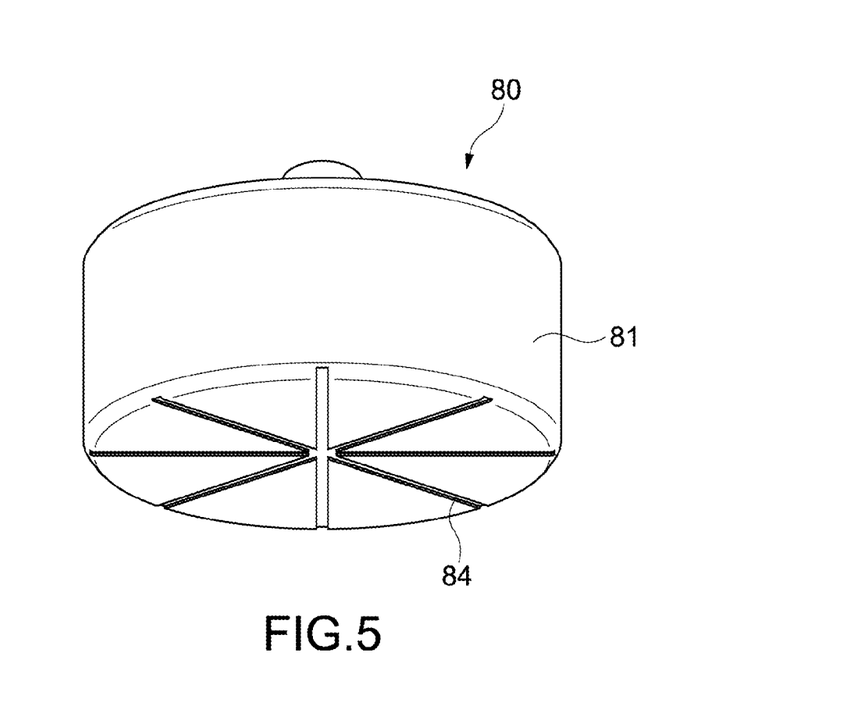
FIG. 5 A perspective diagram of a support member shown in FIG. 1 viewed from downward.

The support member 80 includes grooves 84 for preventing intimately contacting with the diaphragm 40 at a lower surface of the body part 81 that is a contact surface with the diaphragm 40 as shown in FIG. 5. For example, the plurality of grooves 84 are provided radially from a center part.

When the object to be shock-absorbed vibrates in the vertical direction, the stud 20 moves up and down and is elastically supported by the support member 80. At the same time, a damping force is worked thereon due to the resistance when the movable damping plate 70 integral with the stud 20 moves in the liquid 50.

On the other hand, when the object to be shock-absorbed vibrates in the horizontal direction, since the stud 20 is coupled to the housing 10 via the thinner layer part 31 composed of a thinner rubber member, vibration is therefore not transmitted therebetween.

As the support member 80 thus configured is not intimately in contact with the diaphragm 40 and slides easily to the horizontal direction, the stud 20 moves more smoothly in the horizontal direction. Accordingly, when the stud 20 is displaced minutely, the vibration absorbing properties are further enhanced. Also, the support member 80 is not fixed to the diaphragm 40 and the diaphragm 40 is not pulled in the horizontal direction due to the displacement of the support member 80. Thus, durability is improved.

The guide member 100 as a second fixed damping plate is a circular member made of a metal, for example. The guide member 100 is configured of integrating a cylinder part 101 facing to the outer periphery of the support member 80 via a predetermined gap, and a section L-shaped flange part 102 fitted in the housing 1 and fixed to the inner wall of the housing 10 and the flange surface 13 of the housing 10. The gap between the inner periphery of the cylinder part 101 and the outer periphery of the support member 80 functions as a third flow path 113 of the highly viscous liquid 50. The gap between the upper surface of the flange part 102 and the lower surface of the movable damping plate 70 functions as a fourth flow path 114 of the highly viscous liquid 50. As already described above, the guide member 100 also functions to fix the diaphragm 40 to the housing 10.

In the liquid-sealed mount 1 of this embodiment, an excessive pressure is not applied on the highly viscous liquid 50 even if the stud 20 is displaced and a stress for expanding to external is therefore little applied on the thinner layer part 31 of the flexible sealing cap 30. In other words, in the liquid-sealed mount 1 of this embodiment, there is no need to consider an excess internal pressure increase in the housing 10, and the flexible sealing cap 30 can therefore include the thinner layer part 31 having a smaller thickness.

Accordingly, the liquid-sealed mount 1 of this embodiment having flexibility in up, down, left, and right directions has excellent durability without losing a tightness of the housing 10 and without inhibiting a large stroke action of the stud 20.

In the liquid-sealed mount 1 of this embodiment, the highly viscous liquid 50 sealed in the liquid chamber 92 is pressurized and an appropriate pressure is applied. Therefore, even if the movable damping plate 70 moves rapidly due to the large-stroke displacement of the stud 20, cavitation is hardly generated in the liquid, thereby maintaining high damping properties.

In the liquid-sealed mount 1 of this embodiment, when the stud 20 is in a neutral status in the horizontal direction (X direction in the figure), at least the thinner layer part 31 of the flexible sealing cap 30 and the diaphragm 40 just intervene between the stud 20 to which the cab as the second member is connected and the housing 10 to which the vehicle body frame as the first member is connected. In other words, when the stud 20 is in a neutral status in the horizontal direction (X direction in the figure), only a thin rubber functions as a vibration transmission member between the stud 20 and the housing 10, whereby the micro vibration in the horizontal direction is difficult to be transmitted.

In the liquid-sealed mount 1 of this embodiment, the support member 80 such as a columnar body is configured to have a larger volume. In addition, the guide member 100 is provided, whereby the flow resistance can be controlled by using the liquid third flow path 113 formed between the guide member 100 and the support member and the fourth flow path 114 formed between the guide member 100 and the movable damping plate 70. In other words, an outer diameter of the support member 80 or an inner diameter or a position of the guide member 100 is determined as appropriate, thereby providing the desirable flow resistance and increasing a design freedom.

The liquid-sealed mount 1 of this embodiment is configured such that when a load is applied to the stud 20 in a compression direction, a force due to the load in the compression direction is typically directly transmitted from the stud 20 to the diaphragm 40, i.e., to the air chamber 93, via the support member 80. In this manner, the highly viscous liquid 50 sealed in the liquid chamber 92 can have an arbitrary pressure irrespective of an air pressure of the air chamber 93. Accordingly, by applying an arbitrary pressure to the highly viscous liquid 50 so that too much load is not applied to the flexible sealing cap 30 as the cap member, no cavitation is generated due to large strokes of the movable damping plate 70 to provide the liquid-sealed mount 1 with damping properties maintained. Experimental results for confirming the effects are shown below.

Figure 6:
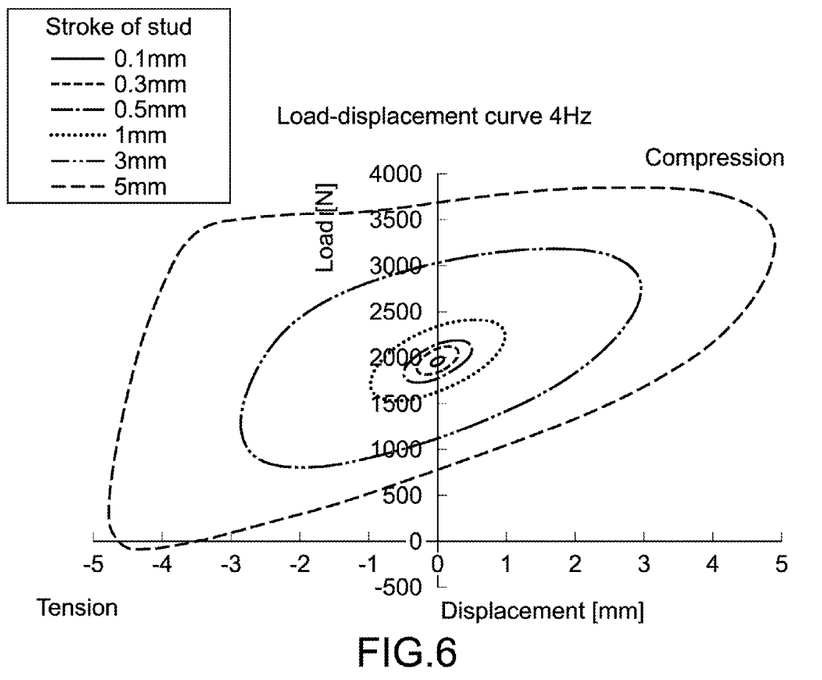
FIG. 6 A graph showing experimental results conducted for confirming advantages of the present invention.
Figure 7:
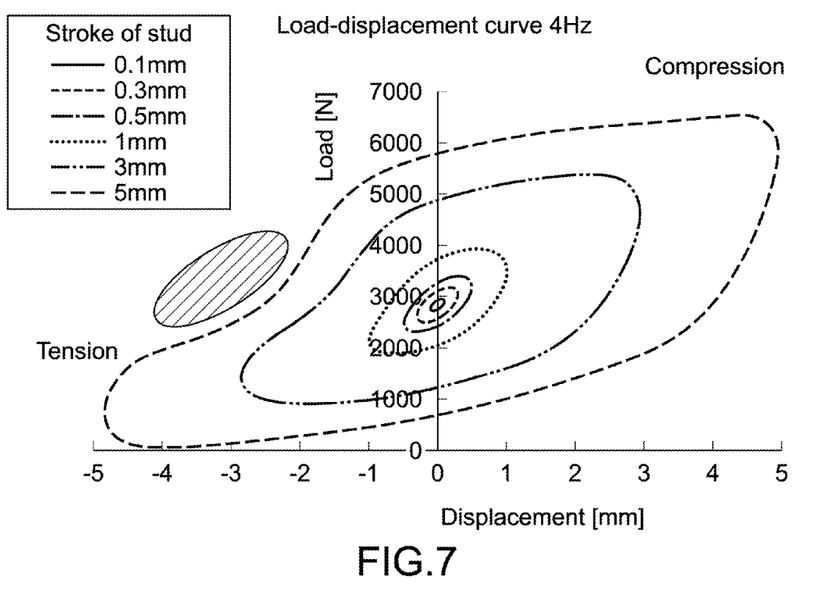
FIG. 7 A graph showing experimental results conducted as a comparative example to the experimental results shown in FIG. 6.

FIG. 6 shows load-displacement properties of the liquid-sealed mount 1 of this embodiment obtained by applying displacement repeatedly to the stud at vibration strokes of ±0.1 mm, 0.3 mm, 0.5 mm, 1 mm, 3 mm, and 5 mm and at a speed of 4 Hz with a 1 G rest state be a 0 position. FIG. 7 shows load-displacement properties of a comparative example of a liquid-sealed mount not including the support member 80 and the air chamber 93 and including a coil spring disposed between the movable damping plate and the bottom of the cup-shaped housing instead of the support member 80 and the air chamber 93 as different from the liquid-sealed mount 1 of this embodiment under the same conditions as that of the present invention. Each of these load properties represents the load applied to each stud, i.e., flow resistances subjected to each movable damping plate. Each of these load properties therefore represents damping properties of each liquid-sealed mount, and each region surrounded by a load curve represents an absorption amount of vibration energy of each liquid-sealed mount.

For example, a coil-spring-type liquid-sealed mount includes a spring member (reference symbol 13) of the liquid-sealed mount apparatus shown in FIG. 1 of Patent Document 2 (Japanese Patent Application Laid-open No. 2003-322198) instead of the support member 80 and the air chamber 93 of the liquid-sealed mount 1 of this embodiment.

As shown in FIG. 6, in the liquid-sealed mount 1 of this embodiment, especially when the damping properties at the vibration strokes of 3 mm and 5 mm are focused, it reveals that a sufficient damping is maintained until near the maximum displacement (−5 mm or −3 mm) once the stud is displaced in a draft direction, i.e., displaced anticlockwise from 5 mm to −5 mm or 3 mm to −3 mm. It is presumed that an internal pressure of the liquid chamber 50 is adequately high and no cavitation is generated. Accordingly, it can be concluded that the regions surrounded by the load curves have large areas and have sufficient damping properties in the liquid-sealed mount according to the present invention.

In contrast, as shown in FIG. 7, in the liquid-sealed mount including the coil spring instead of support member 80 and the air chamber 93, when the damping properties at the vibration strokes of 3 mm and 5 mm are focused similar to that of this embodiment, it reveals that the load is extremely decreased at exceeding zero displacement (−1 mm) once the stud is displaced in a draft direction, i.e., displaced anticlockwise from 5 mm to −5 mm or 3 mm to −3 mm. In other words, the damping properties are decreased. It is presumed that the flow of the highly viscous liquid cannot follow the displacement of the stud and is disrupted and the cavitation is generated in the comparative example. In other words, it is presumed that the flow of the highly viscous liquid cannot follow a displacement speed of the movable damping plate and a negative pressure is generated at a rear surface of the movable damping plate causing the cavitation. In the present invention, it is presumed that as the highly viscous liquid is in the adequate pressurized state, no cavitation is generated as long as the pressure generated by the vibration of the movable damping plate is within the pressurized state.

Accordingly, in the liquid-sealed mount 1 of this embodiment, it is apparent that the cavitation is less likely to be generated in the liquid 50 even with the large strokes and high damping properties are maintained.

In the liquid-sealed mount 1 of this embodiment, the support member 80 such as a columnar body is configured to have a larger volume. In addition, the guide member 100 is provided, whereby the flow resistance can be controlled by using the liquid third flow path 113 formed between the guide member 100 and the support member and the fourth flow path 114 formed between the guide member 100 and the movable damping plate 70. In other words, an outer diameter of the support member 80 or an inner diameter or a position of the guide member 100 is determined as appropriate, thereby providing the desirable flow resistance and increasing a design freedom.

Next, another embodiment of the present invention will be described.

FIG. 8 is a longitudinal sectional view of a liquid-sealed mount according to another embodiment of the present invention.

As shown in FIG. 8, a liquid-sealed mount 2 of this embodiment has a cap member of which configuration is different from that of the above-described embodiment. Hereinafter, only elements different from those of the above-described embodiment will be described and different reference symbols will be attached thereto.

A cap member 121 has a layer structure where a plurality of rubber layers 125a, 125b, and 125c and a plurality of cylinder plates 124a and 124b interposed therebetween, respectively, are concentrically and annularly laminated outside of a sleeve 123 holding a bearing 122 slidably engaged to the stud 20.

The cap member 121 is fixed to the cylinder plate 124b positioned at an outermost side by a caulking means such as caulk pieces 14b formed on the flange part 14 of the housing 10 together with the flange part 64 of the fixed damping plate 60.

Between the stud 20 and the sleeve 123, seal members 126 such as seal gaskets and dust seals are disposed and the bearing 122 is disposed therebetween in the axial direction of the stud 20, thereby sliding the stud 20 in the vertical direction and liquid-tight sealing between the stud 20 and the sleeve 123.

If the liquid-sealed mount 2 having such a configuration includes no support member 80, as the cap member 121 and the stud 20 are insulated in the vertical direction, the load applied to the stud 20 in the compression direction cannot be received by the cap member 121 and is supported by the liquid in the liquid chamber and the air spring in the air chamber. Accordingly, the air spring is pressurized to the volume corresponding to the load in the compression direction via the liquid 50, resulting in excessively high air pressure and liquid pressure. Since the cap member 121 is not held by the stud 20, at this time, the cap member 121 cannot maintain its original position and the sleeve side of the cap member 121 rises along the stud 20. Therefore, it needs a special structure for holding a relative position between the cap member 121 and the stud, for example. In contrast, in the liquid-sealed mount 2 including the support member 80, as the internal pressure will not excessively increase, no such a special structure is necessary. Accordingly, in the liquid-sealed mount 2 according to this embodiment, an action of the stud at least in the vertical direction is not inhibited and a structure that increases the stiffness in the horizontal direction can be added as described above, as appropriate. Thus, there is no need to care about a leak of the highly viscous and high pressure liquid 50 and bondability of slide seals can be low, thereby lowering a friction resistance of the stud 20.

The present invention is not limited to the above-described embodiments, various alternations may be made, and the various alternations belong to the scope of the present technology.

In the above-describe embodiment, the fixed damping plate as an example of the first fixed damping plate is made of the rubber material. It should be appreciated that it is not limited thereto. If the support in the horizontal direction and the damping properties added by the second and third flow paths are unnecessary, the first and second fixed damping plates may not be provided.

In the above-described embodiments, the movable damping plate has the inverted cup shape. It should be appreciated that it may have another shape such as a flat plate. Also, the movable damping plate may be attached to the stud with some backlashes. In addition, a through hole may be provided on the movable damping plate.

In the above-described embodiments, although the liquid is pressurized, but it should be appreciated that the liquid may be at an ordinary pressure.

In the above-described embodiments, although the support member has the columnar shape, but it should be appreciated that the support member may have any one of a variety of shapes such as a conical shape.

In the above-described embodiments, by bending the flange part (joint tabs) disposed at the upper end of the cup-shaped housing, the flange part of the housing, the flange part at the attachment part of the fixed damping plate, and the flange part at the attachment part of the flexible sealing cap are liquid-tight integrated. It should be appreciated that it is not limited to use the joint tabs and they may be liquid-tight integrated by welding means or the like.

DESCRIPTION OF REFERENCE NUMERALS 1, 2 liquid-sealed mount
10 cup-shaped housing
12 opening
20 stud
30 flexible sealing cap as a cap member
31 thinner layer part
40 diaphragm
50 highly viscous liquid
60 fixed damping plate (first fixed damping plate)
66 by-pass passage channel
70 movable damping plate
80 support member
91 sealed chamber
92 liquid chamber
93 air chamber
94 first chamber
95 second chamber
100 guide member (second fixed damping plate)
111 first flow path
112 second flow path
113 third flow path
114 fourth flow path
121 cap member

The invention claimed is:

1. A liquid-sealed mount to be attached between a first member and a second member for controlling vibration introduced to the first member or the second member, the liquid-sealed mount comprising:
  a cup-shaped housing having an opening at a top, the cup-shaped housing being to be attached to the first member;
  a stud positioned at a center of the housing in a diameter direction, the stud being to be attached to the second member;
  a cap member fixed to the opening so as to form a sealed chamber between the cap member and the housing, the cap member holding the stud movably at least in an axial direction of the housing;
  an air chamber formed at a bottom of the housing, air being sealed in the air chamber;
  a diaphragm separating the sealing chamber into a liquid chamber and the air chamber;
  highly viscous liquid sealed in the liquid chamber;
  a movable damping plate positioned in the liquid chamber, a gap being provided between the movable damping plate and an inner wall of the housing, the liquid being capable of passing through the gap, the movable damping plate being attached to the stud; and
  a support member positioned between a lower end of the stud or the movable damping plate and the diaphragm, the support member being configured to transmit a load in a compression direction applied to the stud to the diaphragm, a first surface of the support member being supported by the diaphragm, in a neutral status where a load of the second member is statically applied to the stud;

wherein a second surface of the support member opposite to the first surface is in contact with the movable damping plate or the lower end of the stud, and the support member transmits the load in the compression direction applied to the stud to the diaphragm.

2. The liquid-sealed mount according to claim 1, wherein the air chamber supports a load applied to the stud via the support member in the neutral status where at least the load of the second member is statically applied to the stud.

3. The liquid-sealed mount according to claim 1, wherein an internal pressure of the air chamber is higher than an internal pressure of the liquid chamber.

4. The liquid-sealed mount according to claim 1, wherein the support member is integrally formed with the stud.

5. The liquid-sealed mount according to claim 1, wherein the support member is composed of an elastic member.

6. The liquid-sealed mount according to claim 1, wherein the cap member is composed of the elastic member, has a center part liquid-tightly sealed to the stud penetrating therethrough, is formed of a disk shape, and is capable of following an action of the stud.

7. The liquid-sealed mount according to claim 1, wherein the liquid-sealed mount comprises a first fixed damping plate fixed between the cap member and the movable damping plate, separating the liquid chamber into a first chamber and a second chamber, and having a through hole at a center in a radial direction into which the stud is inserted, a predetermined gap being provided between an inner periphery of the through hole and an outer periphery of the stud inserted.

8. The liquid-sealed mount according to claim 7, wherein the first fixed damping plate has a by-pass passage channel for by-passing the liquid between the first chamber and the second chamber.

9. The liquid-sealed mount according to claim 1, wherein the liquid-sealed mount comprises a second fixed damping plate fixed between the movable damping plate and the diaphragm, and having a through hole at a center in a radial direction into which the support member is inserted, a predetermined gap being provided between an inner periphery of the through hole and an outer periphery of the support member inserted.

10. The liquid-sealed mount according to claim 1, wherein
the support member is positioned between the lower end of the stud or the movable damping plate and the diaphragm, the support member being not separate from the diaphragm.

11. The liquid-sealed mount according to claim 1, wherein the support member is composed of a hard material.

12. The liquid-sealed mount according to claim 11, wherein
the hard material is resin.

* * * * *